350-311
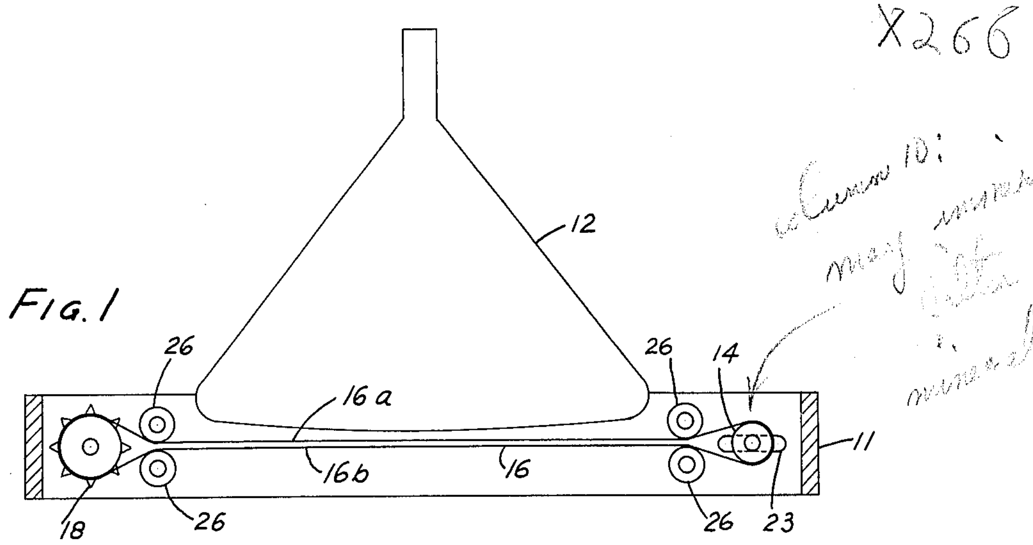
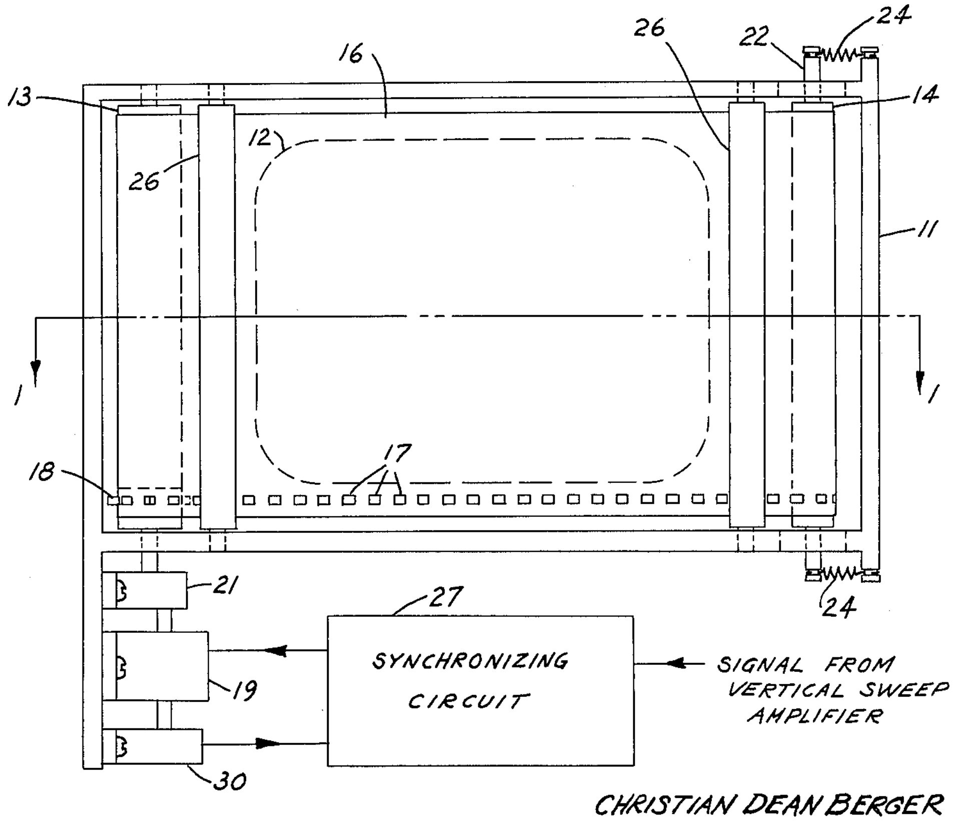
FIG. 2
CHRISTIAN DEAN BERGER
INVENTOR.
BY Darby + Darby
ATT'YS

CHRISTIAN DEAN BERGER
INVENTOR.

BY Darby & Darby
ATT'YS

CHRISTIAN DEAN BERGER
INVENTOR.

BY Darby & Darby
ATT'YS

United States Patent Office 2,728,814

Patented Dec. 27, 1955

2,728,814

COLOR TELEVISION SYSTEM AND APPARATUS

Christian Dean Berger, New York, N. Y.

Application November 25, 1952, Serial No. 322,406

16 Claims. (Cl. 178—5.4)

The present invention is concerned with the art of color television and more particularly relates to improvements in the reproduction of color television pictures for field-sequential television systems.

As is well known, the field-sequential system of color television has been selected by the Federal Communications Commission as the present standard for color television transmission. In this system, the picture tube cathode ray beam scans the raster on its fluorescent screen in successive fields, each field covering the entire raster, and the fields representing successively and repetitively the three primary color components of the polychrome scene being transmitted. Interlacing is introduced without altering the sequence of colors for the successive fields.

In connection with such color television systems, an important problem is to provide simply fabricated and inexpensive means for providing the necessary separate reproduction of these color fields, not only for new color television receivers but as adapters for the approximately 18 million existing television receivers now in use which produce only monochrome pictures. Systems heretofore suggested for these purposes have uniformly been disadvantageous in requiring either expensive and up to now impracticable polychrome picture tubes, or else complex mechanism operating in conjunction with monochrome picture tubes for converting monochrome images of the successive color fields into respective color images. Such mechanisms previously suggested have been both costly to fabricate and cumbersome in use, so as to increase substantially the space requirements and mechanical complexity of the receiver, and to be impracticable as adapters for existing receivers. For example, the whirling disk type of converter from monochrome to multichrome pictures more than doubles the front surface area of a television receiver, and can be used with existing receivers only by means of a converter structure which overshadows the receiver in size. Also, such apparatus has as a practical matter, been usable only with relatively small sizes of picture tube, such as the 10-inch size or smaller. Other solutions heretofore proposed for this problem have required the use of masking members of various special configurations and have also required exceedingly precise registration between the trace of the cathode ray beam of the picture tube and the color-converting apparatus and/or mask.

According to the present invention, these disadvantages are overcome by the present invention, in which there is provided a relatively simple mechanism adapted to be placed over the outer face of the picture tube screen and which will convert field-sequential monochrome images on said screen into the desired multichrome colored reproduction. The apparatus of the present invention occupies little more area than the surface of the picture tube screen and has a depth insignificant in comparison with the normal depth of a receiver, so that the cabinet for such a receiver is not materially enlarged to permit use of the present invention, and when used as an adapter or converter, the apparatus of the invention is unobtrusive in use. Furthermore, there are no masks or complicated registration problems involved.

Other features and advantages of the present invention comprise the use of small motors consuming less power, the use of smaller physical space so that the invention can be incorporated in the design of receivers without radically altering their construction and appearance, and the use of comparatively few slow moving and inexpensive parts which will require a minimum of maintenance and adjustment.

Furthermore, the present invention provides means for readily and simply converting a black and white or monochrome television receiver to color television reception without making mechanical changes in the existing receiver, by merely mounting an embodiment of the invention in front of the receiver viewing screen. Such an embodiment can be incorporated in a relatively flat structure substantially no larger than the front face of the existing receiver so as to avoid intrusiveness in use and to combine harmoniously with existing receivers.

An important feature of the present invention is the use of a continuously moving filter band formed of colored filter strips traveling in front of the picture tube screen. While it is recognized that a filter band or its equivalent has been previously used in the form of the so-called "drum" color receiver, heretofore it has been necessary for such moving bands to encircle the entire receiver tube since it was necessary that only one thickness of the band be interposed between the viewer and the screen. In marked distinction to this, according to the present invention, the moving band is doubled back upon itself, the two folds of the band being closely juxtaposed to one another and moving in opposite directions, and the observer views the television receiver picture tube screen through both portions, that is, front and back portions, of the continuous band. Furthermore, this feature of the double thickness of the band is utilized in a special arrangement to avoid the necessity of any masking members, gratings or the like.

According to another feature of the present invention, the moving filter band is formed of a series of colored filter strips. Normally, the band moves horizontally across the face of the picture tube, the front portion moving in one direction, such as from left to right, and the back portion moving oppositely, such as from right to left. The colored filter strips are sequentially of the three primary colors utilized at the transmitter or closely equivalent thereto, so that each strip transmits light of approximately ⅓ of the visible light spectrum and in substantially non-overlapping relation with respect to the transmissibilities of the other strips. The strips on the moving band are arranged sequentially with respect to the three primary colors, repeated endlessly around the continuous band. Each of these strips is made sufficiently narrow so that, when viewed at the proper viewing distance, the eye will combine or blend all of these strips of a single color component into a single continuous image.

As a further feature of the present invention, these color filter strips of the horizontally moving filter band are slanted slightly from the true vertical, so that on the front and back portions of the continuously moving filter band these strips slant in opposite directions and hence intersect when viewed therethrough. According to one feature of the invention, the rate of movement of the moving filter band is selected to have a speed such that the widest horizontal line of the region of overlap of two strips of the same color is synchronized with the field repetition frequency and will apparently travel vertically at the same rate as the vertical speed of the cathode ray beam trace, In this manner, a maximum effectiveness and color definition is attained.

Other features and advantages of the present invention will become more apparent from a consideration of the following specification describing a preferred embodiment of the present invention, taken together with the appended drawings, in which:

Figure 1 shows a plan view partly in section of an embodiment of the present invention in relation to a television receiver picture tube.

Figure 2 shows an elevation view of the arrangement of Figure 1.

Figure 3:
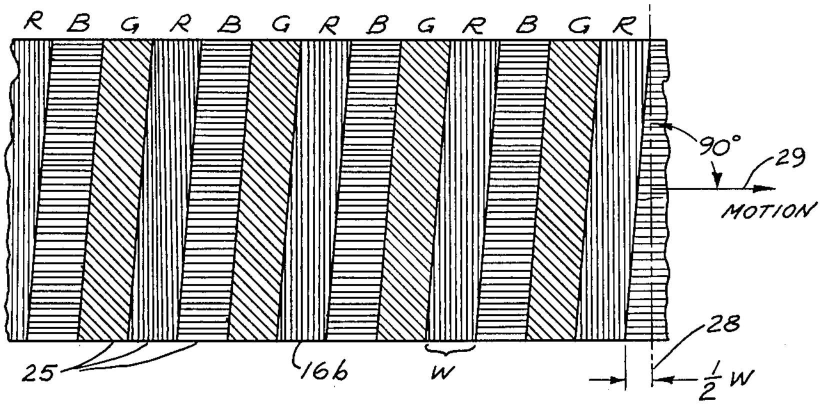
Figure 3 shows an enlarged fragmentary face view of the front portion of the filter band of the present invention.

Referring to Figures 1 and 2, there is shown a frame 11 adapted to be mounted in front of the picture tube 12 of a television receiver. This frame 11 may either be within the usual cabinet in the case of a receiver manufactured explicitly for the reception of color images or it may be part of a converter unit adapted to be positioned in front of the picture tube screen of a monochrome television receiver. Mounted within the frame 11 are a pair of rollers 13 and 14 about which passes the loop of the endless filter band 16. One edge of the band 16 may be provided with perforations such as sprocket holes 17 which cooperate with a sprocket wheel 18 for the purpose of driving the filter band 16 at a uniform rate of speed. The sprocket wheel 18 is driven from a motor 19 through a suitable speed reducer 21 to obtain the desired linear speed of the filter band 16 as will be described below.

The speed of motor 19 is controlled from the receiver synchronizing circuit 27 which in turn is supplied with the vertical synchronizing pulse signals from the usual vertical sweep amplifier. As will be shown below, the horizontal linear speed of the endless filter band 16 is the same regardless of the size of the picture tube, and hence is the same for all receivers. Accordingly, the motor 19 operates at fixed speed. To maintain this speed in synchronism with the trace of the television image in the relationship to be described, any one of the well-known circuits may be used such as those which have been developed for synchronizing the speed of a rotating color wheel for field-sequential television receivers. For example, an alternator 30 may be coupled to the shaft of motor 19, the output signal of the alternator 30 being compared by the synchronizing circuit 27 with the output signal of the vertical sweep amplifier of the television receiver to keep these two signals synchronized within very close limits. The synchronizing circuit 27 then causes any differential between these two signals to vary the power input to the motor 19 to adjust its speed accordingly. It will be understood that other means of obtaining suitable synchronism may be used as desired. In particular, since the motor speed is constant, reliance may be had upon the usual 60-cycle power source whose frequency is usually maintained very precisely by the power generating stations. In such case, motor 19 may be a synchronous alternating current motor, the speed reducer 21 being designed to have the ratio required yield the proper speed for the filter band 16. It has been found that the 60-cycle power supply deviates so slightly from a constant frequency as to require merely an occasional re-phasing of the filter band 16 with respect to the image on the picture tube, in a simple manner described below.

The roller 13 is coaxial with sprocket wheel 18 and may either be rigidly secured to the sprocket wheel 18 or may rotate freely relative to the sprocket wheel 18, as may be desired in order to avoid the necessity for fabricating the roller 13 with precise diameter. In such case, the diameter of the roller 13 may be slightly larger than the pitch diameter of the sprocket wheel 18 to minimize wear at the sprocket holes 17. The roller 14 is preferably resiliently mounted to take up slack and to provide proper tension for the filter band 16. This may be done in any desired manner, one such way being shown in Figures 1 and 2. Thus, the roller 14 is rotatably mounted on a fixed axle 22 which passes through slots 23 in the frame 11 and is resiliently urged toward the right in these figures by suitable springs 24 coupled between the ends of axle 22 and frame 11. The filter band 16 also passes over idler rollers 26 suitably journaled in frame 11 and which properly position filter band 16 so that the rear portion **16*a* and the front portion 16*b* of the band are maintained substantially planar in closely parallel but preferably non-rubbing relationship. The springs 24 are selected or adjusted to provide sufficient tension to take up slack and to maintain the band portions 16*a* and 16*b*** in this desired parallel non-contacting relationship.

Figure 4:
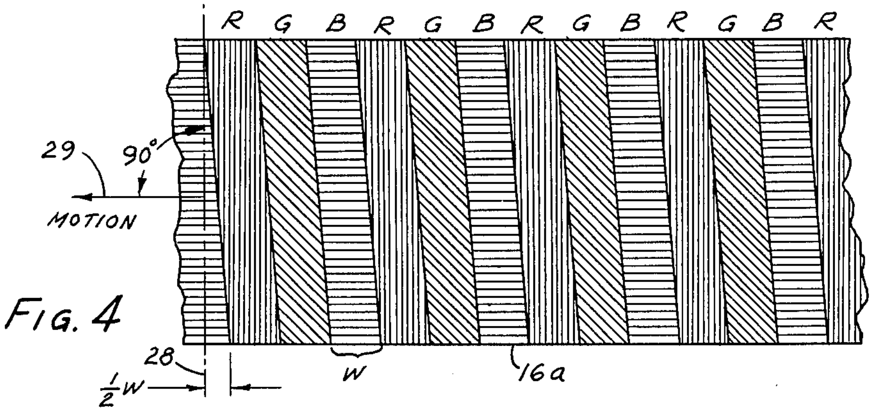
Figure 4 shows a similar view of the rear portion of the filter band.
Figure 5:
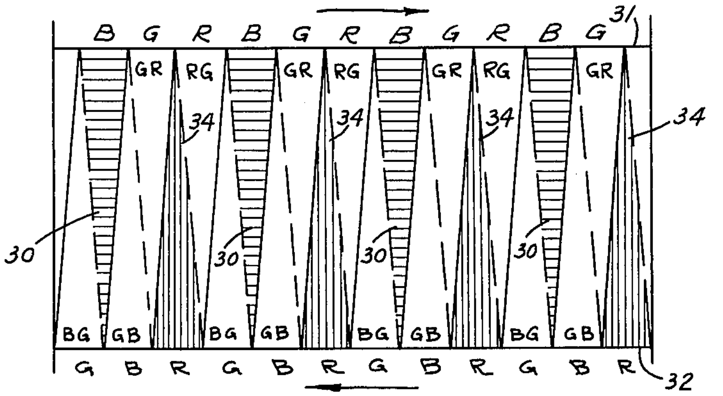
Figures 5, 6 and 7 show fragmentary views of the filter band with front and rear portions in different relative positions occurring at different instances of time.
Figure 6:
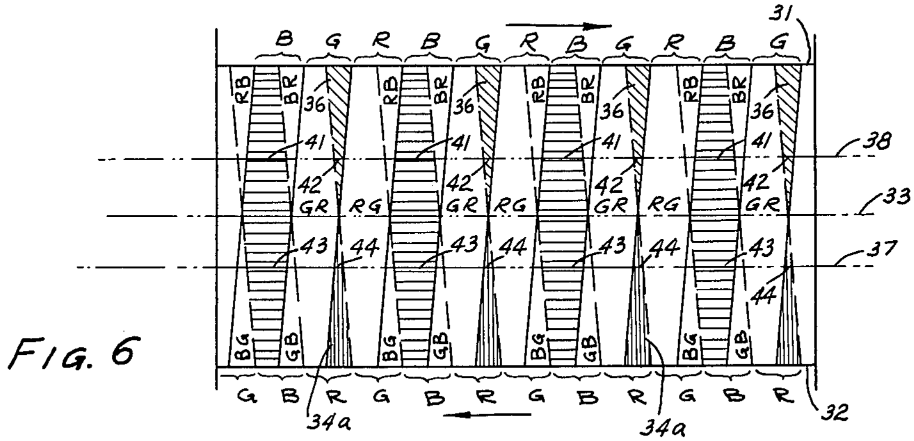
Figure 7:
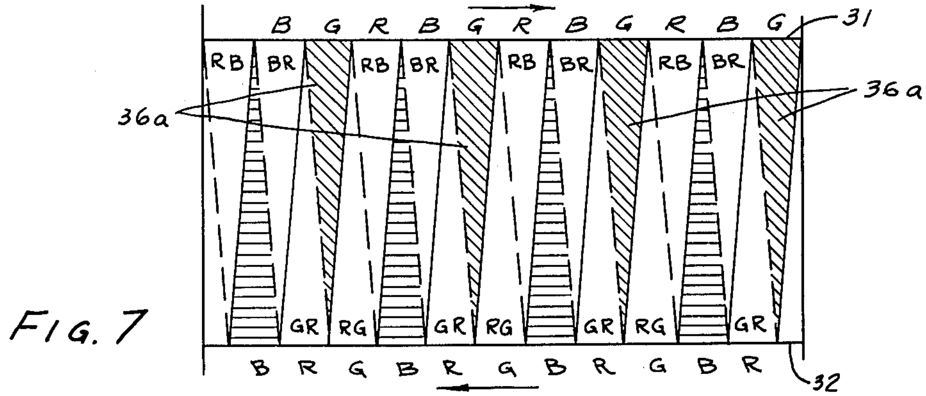

The vital portion of the present invention consists particularly in the arrangement of the band 16 which is shown in Figures 3 and 4, its operation being explained with respect to Figures 5 to 7.

Figure 8:
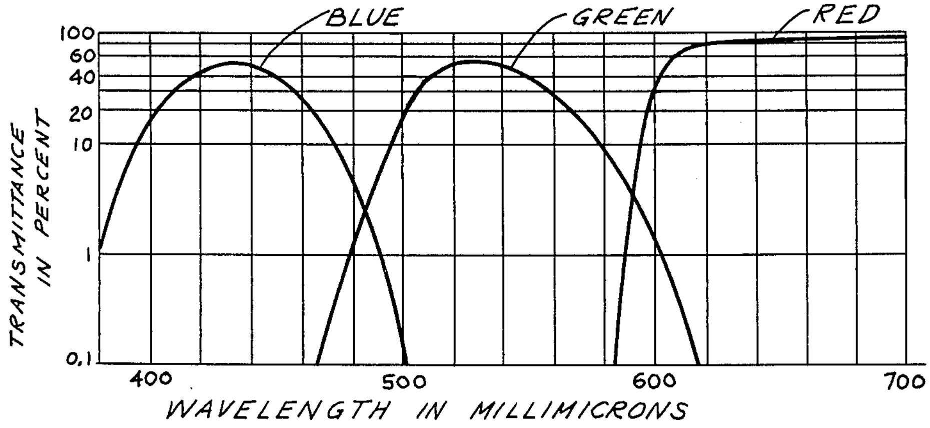
Figure 8 is a graph showing the relationship of the spectral characteristics of the respective primary color filter strips forming the filter band.

As indicated in Figures 3 and 4, the endless filter band 16 is provided with repetitive strips 25 of color filters. These filter strips 25 are of three different light transmission characteristics, designated here as red, blue and green, arranged in narrow, equal width, parallel strips R, B, G over the entire length of the endless band 16 in a repeating sequence of red, blue, green, red, blue, green, etc. as viewed from the outside of the loop of band 16. The width of each strip 25 is made small enough so that the human eye will combine the images visible through the various colored strips at a normal or usual viewing distance. As a practical example of such width, these strips 25 may be on the order of 1/32 inch wide, although other widths may be used, corresponding to the viewing distance. The numbers of red, blue, and green filter strips 25 on the entire band 16 are equal, so that the repeating cycle of respective colors is maintained continuously around the entire band 16. The dyes of which the filter strips 25 are composed are selected so that each transmits substantially an individual third of the visible spectrum, not substantially overlapping that of the others, as indicated in Figure 8. In this manner, when two of the strips of different color are superposed, such as R and B, or B and G, or G and R, substantially no light is transmitted therethrough. However, when two strips of the same color are superposed, such as B and B, R and R, or G and G, light of that color is transmitted therethrough. It has been found that the dyes used in Wratten filters No. 26, 47B, and 58 are suitable examples of such dyes.

The filter band 16 may be formed in several different ways; for example, the filter strips may be of gelatin, dyed to suitable color and supported upon a clear flexible plastic film such as cellulose nitrate or cellulose acetate or other suitable material. Alternatively, the various filter strips may be printed directly on such a transparent film, as by mechanical printing processes similar to those used in multichrome printing. In such case, the printing rollers can be very accurately fabricated by photographic methods and properly registered to provide accurate, parallel, equal width filter strips 25, as desired.

It will be understood that the filter strips 25 need be placed only on the portion of the band 16 which overlies the face of the picture tube 12 as seen in Figure 2, and the portions of the band 16 shown in Figures 3 and 4 are considered to have a height substantially equal to or slightly larger than the maximum vertical dimension of the visible face of the picture tube screen, which is substantially the height of the picture tube raster. Figures 3 and 4 show the arrangement of the respective filter strips 25 whose cross-hatching indicates their light transmission color, which is also indicated by the initials R, B and G appearing thereabove. As shown in Figure 3, which is a representation of the front portion 16*b* of the filter band 16, the filter strips 25 are slanted forward with respect to the transverse line 28 of band 16, line 28 being perpendicular to the direction of motion 29. Thus, as shown, each filter strip 25 is lagging at the bottom of the band 16*b* with respect to its position at the top of the band by an offset. Preferably this offset is equal to one half of the width of the strip 25, although, as shown below, the offset may have other values. Figure 4 shows the corresponding inner portion 16*a* of the same band 16 and, since the band 16 has been reversed around the roller 14, it will be seen that the sequence of colors of the color filter strips 25 is reversed, now being R, G, B, R, G, B etc., and the strips 25 now lean or slant in the opposite direction.

By virtue of the particular choice of degree of slant of the color filter strips 25, the relationship between the rear and front filter band portions 16*a* and 16*b* in one position will be as shown in Figure 5. In this figure, the edges of the color filter strips 25 of the front portion 16*b* are shown in solid line while the edges of the color filter strips 25 on the rear band portion of 16*a* are shown in dashed line. The front (solid) strips are labelled B, G and R at the top edge 31 of band 16, while the rear (dashed line) strips are labelled G, B, R at the bottom edge 32 of band 16.

Figure 5 represents the condition in which at the upper edge 31 of the filter band 16 the blue strips B are in exact registration. Because of the fact that the rear and front strips 25 slant in opposite directions, at the lower edge 32 of the band 16 the blue strips B are completely out of register, and the area of registration of the front and rear blue strips B is accordingly wedge-shaped, tapering from a maximum at the top band edge 31 to the minimum of the bottom edge 32. This area is shown with horizontal cross-hatching to designate blue color.

At the same time, the red strips R will be in register along the bottom edge 32, and this area of registration of the red strips will similarly taper to a point at the top edge 31, as is shown by the vertical cross-hatching. The remaining wedge-shaped areas are labelled by pairs of the letters B, G and R, the first letter designating the color of the front filter strip 25 while the second letter designates the color of the rear strip. Since in each of these cases the two colors are different, these areas are substantially opaque, the only transparent areas being the blue and read cross-hatched wedges.

As has been shown, the front portion 16*b* of the band 16 moves in one direction, such as to the right, while the rear portion 16*a* moves in the other direction, such as to the left. As a result, along the top edge 31, for example, the blue strips are moving in opposite directions and, after a brief period of time will have moved partially out of register. Figure 6 shows the situation after the front band portion 16*b* has moved to the right by one-quarter of the width of a filter strip 25, while the rear band portion 16*a* has moved to the left by the same amount. As is seen from this figure, along the top edge 31 the two blue strips B now overlap for only part of their width, namely half in this instance. Also, at the bottom edge 32, instead of zero overlap as in Fig. 5, the front and rear blue strips now half overlap. Also, along the center line 33, these strips now overlap fully, the overlap width being equal to the strip width.

At the same time, the region of overlap of the red strips has diminished, the apex of the red wedge-shaped overlap region 34 shown in Figure 5 having effectively descended to leave only the partial red wedge-shaped area 34*a* in Fig. 6. At the same time, an inverted green overlap wedge-shaped area 36 of half-height has appeared.

Figure 7 shows the situation after a further interval of time equal to the interval between the situations of Figures 5 and 6. As shown here, the region of maximum width of the blue overlap area has now descended to the bottom edge 32 of the filter band 16. Also, the red overlap area 34, 34*a* has now vanished and the green overlap region 36 has now increased to a full height wedge 36*a*.

It will be noted that, in Figure 5, along the line 31 the filter band 16 is completely opaque except for the blue overlap regions since in between the blue strips along line 31 either a green strip overlies a red strip or a red strip overlies a green strip, providing an opaque condition. Moreover, the blue overlap regions have maximum width along this line. Similarly, in Figure 6, the same situation exists along line 33, and in Figure 7, the same situation exists along line 32. It will be understood that the situations depicted in Figures 5, 6 and 7 are in a sense instantaneous snapshots. Actually, there is a gradual progression from the situation of Figure 5 through that of Figure 6 to that of Figure 7 and the line 33, along which the filter band 16 is transparent only to blue color, effectively moves downward from position 31 to position 32 uniformly and linearly as the band 16 is moved horizontally at a constant speed. The line 33 (whose upper and lower extreme positions are 31 and 32) may be termed a uniformly descending line of monochrome transmissibility or transparency.

It will be understood that in the succeeding intervals of time, following the situation in Figure 7, the same thing happens successively with respect to the other two color components. Thus, in Figure 7, it will be seen that along line 31 at the upper edge of the band 16, the band 16 is transparent only to green, since along that line 31 the green filter strips overlap, and the band 16 is otherwise opaque since the other color strips are not in registry. This line of green transmissibility or transparency in the succeeding intervals progresses uniformly vertically downward to the position 32 in the same manner as the blue transparency line shown at 31 in Figure 5 uniformly descended through position 33 in Figure 6 to the position 31 of Figure 7, and, similarly, in the following interval of the same thing happens with respect to the color red. Thus the present system produces a uniformly descending signal color transparency line, the three primary colors of the system following one another cyclically, each color line, as it reaches the bottom 32 of the band 16 being replaced by the line of following color appearing at the top 31 of the band 16.

As is well known, the television image is formed by the action of the cathode ray beam "writing" on the fluorescent screen of the picture tube, in successive parallel lines forming a raster, the varying light intensity along each line in response to the varying video signal building up a pattern of light and dark portions of the screen forming the image. In monochrome television, the light produced is is of one color, usually white. In the field-sequential television system, the video signal is formed by three sets of color-component signals, each representative of one primary color component of the scene being transmitted, each of the color-component signals being continuously transmitted for the period of a full field, during which the image lines extend over the entire raster area, and the respective color-component signals following one another cyclically and repetitively. The respective color fields are repeated sufficiently rapidly so that the persistence of human vision overlaps the several primary color fields to form a polychrome image. Under present standards, these are 144 fields per second, each field therefore occupying $\frac{1}{144}$ second.

When using a monochrome picture tube, having a white and black image, it is necessary to convert each such field image into a respective primary color image. This has been done in the past by placing a primary color filter over the face of the picture tube for the field period, synchronously changing the filter as the color fields change from one color to another. A known form of such filter is the color wheel or drum whose rotation is synchronized with the field change. The present invention provides an improved color conversion apparatus eliminating the disadvantages of size, cost and complexity of such prior art structures.

As indicated above, the present filter band arrangement produces a uniformly moving horizontal line 33 which at any one time can transmit only light of one primary color. According to an important feature of this invention, the motion of this monochrome transparency line 33 vertically downward across the face of this picture tube screen is synchronized with the scanning of the electron beam producing the image lines, so that the image line is always directly behind the transparency line 33 of the filter band 16. This is done by proper selection of the uniform speed of the filter band 16, and by proper phasing of the band motion to the beam scanning.

The proper selection of filter band speed to assure synchronism between the movement of the monochrome transparency line 33 and the actual trace on the face of the picture tube screen is determined by the following factors.

As will be seen from the above discussion, in the preferred form of the invention, the front filter band portion **16*b* moves to the right a distance equal to one-half the width of one filter strip 25 during the interval between the situations of Figures 5 and 7. At the same time, of course, the rear filter band portion 16*a* moves to the left by the same distance of one-half of the strip width. During this same interval, the blue transparency line 33 travels completely from the top to the bottom of the filter band 16. Since in this same interval, the trace line travels completely from the top to the bottom of the picture tube screen, it will be seen that the proper synchronism is provided if the time taken by one field is made equal to the time taken for the band to move one-half of a strip width. If, for example, the width of each strip is $\frac{1}{32}$ of an inch, then the horizontal speed of the filter band 16** must be $\frac{1}{64}$ of an inch in $\frac{1}{144}$ of a second or $2\frac{1}{4}$ inches per second, which is a readily attainable and practicable speed. It will be noted that this speed is entirely independent of the vertical height of the picture tube and is the same for all sizes of tubes.

It is realized that a portion of the field interval of $\frac{1}{144}$ second is also required for the retrace of the cathode ray beam from the lower right hand corner to the upper left hand corner. This factor is compensated for by selecting the vertical height of the filter strips 25 correspondingly. Thus, in the standard F. C. C. approved color television signal, 93% of the total field interval is occupied by the scanning and the remaining 7% by the retrace. Correspondingly, the height of the color strips are made 100/93 times the height of the picture tube raster to accommodate the retrace time. It thus follows that for each size of picture tube, such as the standard 17 inch or 20 inch rectangular tubes or the standard 16 inch or 19 inch circular face tubes, there will be an individual height for the filter band 16. However, all these bands will be moved linearly at the same rate of speed regardless of the picture tube size. Of course, for different widths of filter strips in the filter band, different linear speeds may be used.

With the above chosen speed for the filter band, it will be clear that proper color reproductions will be attained. Thus, suppose that, at the instant at which the band 16 is in the position shown in Figure 6, the phasing of the band movement with respect to the scanning of the image produced on the picture tube screen is such that the picture tube cathode ray beam is beginning to "write" the middle line of the first field of the blue component of the polychrome picture. The picture tube screen produces this middle line in white light. The only portion of the filter band 16 which is effective to transmit any portion of that white line is the portion along the monochrome transparency line 33 of Figure 6. As just seen, this can transmit only the blue color component of the white image line at the spaced line segments where the blue filter strips overlap, and blocks out all other light. Therefore, the viewer sees only blue light. Naturally, if the white line on the picture tube screen varies in intensity along its length, the blue image transmitted through the filter band will correspondingly vary in intensity. Since the eye blends the discrete blue segments into a continuous blue line, the net effect is that the blue component is faithfully produced. In the next line interval, the cathode ray beam writes a subsequent white line on the screen. By the time this takes place, the monochrome transparency line 33 of Figure 6 has moved downward exactly the distance between two lines of the image, and once again the white line written on the picture tube screen is opposite a solely blue filter line. Accordingly, as each image line is written, the monochrome transparency line 33 keeps in step with it, to maintain itself continuously in front of the trace on the picture tube screen. The net result is that the entire blue field is reproduced by having what is effectively a blue filter continuously interposed between the viewer and the picture tube for the entire blue field.

It is to be noted that, although at any one instant the entire filter band 16 may have areas transparent to light of different colors, this is immaterial since the portion of the band 16 which cooperates with the trace at each instant has only a single color transmissibility. Thus, although in Figure 6 there are green transmissible areas 36 and red transmissible areas **34*a*, none of these has any effect since the portion of picture tube face behind these areas is blank and unlighted. The only region in which the picture tube screen is producing white light is behind the line 33**, which has only monochrome transmissibility.

By virtue of the arrangement described above, at the completion of the blue color field, a green transmissibility line appears at the top edge of the filter band 16, just as the green color field begins, and this transmissibility line maintains itself in step with the beam trace during this color field, and the same thing occurs during the red color field. Hence, during the entire polychrome frame, the picture tube screen cooperates with the proper color of transmissibility line to reproduce the various sequential color fields and hence to form the entire polychrome image.

In the above description, it has been tacitly assumed that the trace of the cathode ray beam on the picture tube screen has an extremely short persistence, that is, the created light dies out almost immediately. This is a condition which can be utilized in practice by using known picture tubes, since by virtue of the inherent persistence of vision of the human eye, all of the instantaneous light spots thus produced are blended into a composite and complete picture. However, in some picture tubes, it has been found desirable to retain the image of the trace on the screen for a predetermined interval of time after the cathode ray beam has advanced further. This interval may, for example, persist for several lines, so that at any one instant there may be several lines of the raster which are illuminated simultaneously. In an exaggerated situation, this might mean that, referring to Figure 6, the entire portion of the picture tube screen behind the filter band 16 between lines 33 and 37 may be illuminated at once. It will be immediately seen that, if there is illumination behind line 37, then at points such as 44 there will be some red light produced, which would give a type of color distortion or fringing effect which is undesirable.

This undesirable color distortion can be substantially eliminated merely by properly phasing the monochrome transmissibility line 33 with reference to the actual scanning of the cathode ray beam. For example, let it be assumed that there is a sufficient persistence on the screen of the cathode ray tube to cause the entire region between lines 37 and 38 of Figure 6 to be producing light simultaneously. Along line 38, in addition to the desired blue light produced at regions 41, there will also be some undesired green light produced at regions 42. Along line 37, as indicated previously, in addition to the desired blue light produced at regions 43, there is also undesired red light at regions 44. It will be understood that, under the conditions shown in Figure 6, the actual cathode ray beam trace is at the position of line 37 and the remaining light produced in the region between lines 37 and 38 is due to the persistence of those other portions of the screen previously activated. By locating the monochrome transmissibility line 33 between the lines 37 and 38 at that instant, by phase delaying the movement of the monochrome transmissibility line 33 relative to the movement of the actual trace of the picture tube, it will be seen that both green and red light is produced simultaneously in the regions 44 and 42 of Figure 6. As stated, line 38 is now being illuminated by the persistence of a cathode ray trace that occurred a few moments earlier, and light is seen through areas 41 and 42. However, when the actual cathode ray trace was being "written" along line 38, the filters were in a position such that areas 43 and 44 occurred at line 38. During the time that line 38 remains illuminated, because of persistence, it is initially seen through areas 43 and 44, which gradually change, as the filter band moves, to become areas 41 and 42. As shown in Figure 6, areas 43, and 41 are blue, area 44 is red, and area 42 is green. At line 38, therefore, by the combined action of the persistence of vision and lack of resolving power of the human eye, this green light will combine with this red light and some of the blue light to form essentially white light. This white light will partially desaturate some of the desired blue light image, but the color distortion will thereby be converted into a purity distortion, which is readily acceptable to the viewer and hardly perceived. The dephasing of the monochrome transmissibility line 33 relative to the cathode ray beam is approximately half way between the lines 37 and 38, although due to the normal exponential decay of a light from fluorescent screen, this dephasing time interval will be somewhat less than one half of the total time interval between liens 37 and 38, which is equal to the complete decay time of the screen material. The dephasing time interval required for the red field and the green field is the same as that needed for the blue field. This follows from the fact that the red, blue and green filters are balanced to give white light when additively combined, and therefore will balance the same way if equal fractions are combined.

The proper phasing of the monochrome transmissibility line of course depends upon the proper phasing of the filter band 16 itself. This is readily accomplished in well-known ways, such as by interposing a slip clutch in the drive arrangement between motor 19 and the sprocket wheel 18. Alternatively, and more simply, this dephasing can be controlled merely by a manually controlled brake which when actuated momentarily serves to slow down the motor or the sprocket wheel 18. By a few manual touches on such a brake, the proper phasing of the band 16 can be readily attained to adjust it to a condition of optimum picture, as by visually judging the absence of color distortion.

It should be noted that the length of the band 16 is not critical so long as the band is of sufficient length to cover the entire face of the picture tube. Any changes in length caused by temperature or humidity or stretching affects the belt uniformly over its entire length, and has no effect upon the alignment of the filter strips 25 on the front and rear band portions. Any such change in length as by stretching or shrinking is readily taken up by the tension springs 24, and hence the band 16 is self-compensating with respect to such factors.

While in the above described embodiment, the offset defining the slant of the filter strips 25 has been chosen as one half the width of the strips, this is not a necessary condition, although preferred because it yields a minimum speed for the band 16. Other offsets can be used, particularly those which are higher multiples of the half-strip-width, such as two or more times the half-strip-width, and in such case the band speed is multiplied correspondingly. Preferably, multiples divisible by three are not used, and for some multiples the order of progression of the colors is reversed. It should be noted that for an offset which is a multiple $n$ of the half-width of the strip, $n$ lines of transmissibility are formed at once, and synchronization is made with every $n$th line.

In the above description, no mention has been made of interlace, since any degree of interlace is automatically taken into consideration by using the field frequency as the basis for design. Interlace does introduce a very small phase shift, so small as to have no substantial visible effect.

Also, while the filter strips have been illustrated as uniform width and rectilinear, other shapes can be used, either with uniform or non-uniform band speeds.

Further advantage can be gained by immersing the entire filter band in a colorless transparent liquid of high refractive index, such as mineral oil. This may be done by enclosing the filter band between two sheets of transparent material containing such a liquid. In such case, side viewing is improved, since the refraction of light passing through the liquid causes light to pass through the filter band more nearly normal. Also, less light is lost by reflection at the surfaces of the band, and any wearing effects of rubbing between the front and rear portions of the filter band are minimized.

It will be understood that the above description is illustrative only and covers a preferred embodiment of the invention. However, the invention is not to be considered limited to the exact constructions shown since it will be readily apparent to those skilled in the art that many apparently widely different variations are possible within the spirit and scope of the present invention, which is defined solely by the appended claims. Where the words "a multiple" are used in the claims, it includes the multiple "one" as well as higher multiples.

What I claim is:

1. A color television receiver for a field-sequential tri-color television system, comprising a picture tube having means for producing a cathode ray beam therewithin, a screen and means for periodically and cyclically sweeping said beam across said screen to form an image raster; means for modulating said beam in intensity in accordance with a tri-color field-sequential video signal to produce a monochrome image on said screen, said image being formed by successive color fields representative of the respective primary color components of the tri-color scene being transmitted; and a color converter for converting said monochrome reproduced image into a tri-color reproduced image, comprising an endless filter band disposed in a narrow loop having two planar portions disposed parallel and closely adjacent to one another and interposed between said picture tube screen and the viewer in juxtaposition to said screen, with the width of said filter band arranged along the vertical dimension of said screen and said filter band completely covering said image raster, said filter band comprising an endless sequence of generally vertical narrow linear filter strips parallel to one another and of uniform and equal width blendable by the human eye at normal viewing distances, said strips being cyclically of the respective primary colors of said tri-color television system around the entire loop of said filter band, each of said strips being slanted with respect to the vertical edge of the image raster by being offset from said vertical edge by a distance equal to one-half the strip width in a vertical distance substantially equal to the 100/93 times the height of said image raster, and means for moving said filter band horizontally at a uniform speed with the rear portion thereof facing said picture tube screen proceeding in one direction and the front portion facing the viewer proceeding in the other direction, said filter band speed being synchronized with the field repetition rate of said television system and moving said filter band a horizontal distance equal to said offset in the time interval of the duration of a single color field.

2. A color television receiver for a field-sequential polychrome television system, comprising a picture tube having means for producing a cathode ray beam therewithin, a screen and means for periodically and cyclically sweeping said beam across said screen to form an image raster, said beam being modulated in intensity in accordance with a polychrome field-sequential video signal to produce a monochrome image on said screen, said image being formed by successive color fields representative of the primary color components of the polychrome scene being transmitted; and a color converter for converting said monochrome reproduced image into a polychrome produced image, comprising an endless filter band disposed in a narrow loop having two planar portions disposed parallel and closely adjacent to one another and positioned in front of said picture tube screen with the width of said filter band arranged along the vertical dimension of said image raster and with said band completely covering said raster, said filter band comprising an endless sequence of filter strips arranged parallel to one another and of equal width, said strips being cyclically of the respective primary colors of said polychrome television system, each of said strips being slanted with respect to the vertical by being offset from the vertical by a distance equal to a multiple of one-half the strip width, and means for moving said filter band horizontally at a uniform speed synchronized with the field repetition rate of the said television system, with said filter band moving a horizontal distance equal to said offset in the time interval of the duration of a single field.

3. A color television receiver for a polychrome field-sequential television system comprising a picture tube having a screen, an endless filter band arranged in a narrow loop having two planar portions disposed parallel and closely adjacent to one another and covering said picture tube screen, said filter band comprising an endless sequence of generally vertical linear filter strips parallel to one another and of uniform and equal width, said strips being of the respective primary colors of said television system repeated cyclically around the entire filter band loop, each of said strips being slanted with respect to the vertical, and means for moving said filter band horizontally at a uniform speed synchronized with the field repetition rate of said television system.

4. A color television receiver for a polychrome field-sequential field system, comprising a picture tube, means for producing on said picture tube an image formed by successive color fields representative of the primary color components of the polychrome scene being transmitted, and an endless filter band having filter strips of the respective primary colors of said television system repeated cyclically around the entire loop of said filter band, said band having two portions thereof juxtaposed in front of said picture tube, whereby said picture tube may be viewed only through both of said filter band portions, and said filter strips being slanted with respect to the vertical edge of said image.

5. A color receiver as in claim 4, further including means for moving said band horizontally at uniform speed synchronized with the field repetition rate of said system.

6. In a color television receiver of the field-sequential type having a picturetube with a cathode ray beam therewithin swept periodically and cyclically across a screen to form an image raster, a color converter comprising an endless filter band disposed in a narrow loop having two planar portions disposed parallel and closely adjacent to one another and adapted to be positioned in front of the screen of said picture tube, said filter band comprising an endless sequence of generally vertical linear filter strips parallel to one another and of uniform and equal width, said strips being transmissible of light of the respective primary colors of said television system cyclically arranged around the entire loop of said filter band, each of said strips being slanted with respect to the vertical and having an offset from the vertical defined by an acute angle whose tangent is substantially a multiple of one-half the ratio of the width of said filter strips to the height of said image raster, and means for moving said filter band horizontally at a uniform speed substantially equal to the product of the multiple of one-half the width of said filter strips and the color field repetition frequency of said television system.

7. In a color television receiver for a field-sequential polychrome television system, an endless filter band disposed in a narrow loop having two closely juxtaposed portions, said portions being adapted to be positioned closely in front of a picture tube to cover the screen thereof, said filter band comprising an endless sequence of filter strips parallel to one another and of equal width, said strips being transmissible of the respective primary colors of said polychrome television system repeated cyclically around the entire loop of said filer band, each of said strips being slanted with respect to the vertical by an angle whose tangent is substantially equal to an integral multiple of half the width of said strips divided by the effective height of said screen, and means for moving said filter band horizontally at a uniform speed substantially equal to the product of said multiple strip half-width and the field repetition frequency of said system.

8. Apparatus for converting a monochrome image produced on the screen of a picture tube supplied with field-sequential polychrome video signals to a polychrome reproduced image, comprising an endless filter band having two overlapped portions thereof adapted to be disposed in front of the screen of said monochrome picture tube, said filter band comprising an endless sequence of equal width filter strips of the respective primary colors of said polychrome television system, cyclically repeated around the entire loop of said filter band, each of said strips being slanted with respect to the vertical, and means for moving said filter band horizontally at a uniform speed, with one of said overlapped portions proceeding in one direction and the other of said portions proceeding in the opposite direction, said speed being synchronized with the field repetition rate of said television system.

9. In a color television receiver for a polychrome field-sequential television system having a picture tube with a light-producing screen, an endless filter band having a pair of planar portions disposed closely adjacent to one another and adapted to be positioned before said light-producing screen of said picture tube, said filter band comprising an endless sequence of filter strips of the respective primary colors of said polychrome television system cyclically repeated around the entire loop of said filter band, said strips being slanted at an acute angle with respect to the vertical, and means for moving said filter band horizontally with said pair of portions thereof moving in opposite directions at uniform speed and synchronized with the field repetition rate of said television system.

10. A filter arrangement for polychrome color television receivers, comprising an endless filter band disposed in a narrow loop having two planar portions disposed parallel and closely adjacent to one another, said filter band comprising an endless sequence of inclined linear filter strips parallel to one another and of uniform and equal width, such strips being of the respective primary colors of said polychrome television system repeated cyclically around the entire loop of said filter band, each of said strips being slanted with respect to the vertical at an acute angle whose tangent is substantially equal to an integral multiple of one-half the ratio of the width of said strips to the height of the picture tube image raster with which said filter band is designed to cooperate.

11. In a color television receiver for a field-sequential polychrome television system, an endless filter band having two planar portions disposed closely adjacent to one another, said filter band comprising an endless sequence of linear filter strips of the respective primary colors of said polychrome television system cyclically repeated around the entire loop of said filter band, each of said strips being slanted at an acute angle with respect to the transverse dimension of said band.

12. A filter for use with color television receivers, comprising an endless filter band comprising an endless sequence of narrow linear filter strips parallel to one another and of uniform and equal width, said strips being of three respective substantially non-overlapping light transmissibilities in the visible light spectrum repeated cyclically around the entire loop of said filter band, each of said strips being at an acute angle with respect to the transverse dimension of said band.

13. A filter as in claim 12 wherein said band has a pair of parallel closely adjacent plane portions.

14. Color television apparatus for a polychrome field-sequential television system, comprising an endless filter band having an endless sequence of filter strips of the respective primary colors of said television system repeated cyclically around the entire loop of said filter band, each of said strips being slanted with respect to the transverse dimension of said band.

15. A filter for use with color television receivers, comprising an endless filter band having an endless sequence of narrow filter strips, each adapted to transmit light of a respective one of three substantially non-overlapping portions of the visible light spectrum, said strips being cyclically repeated around the entire loop of said filter band, each of said strips being slanted with respect to the transverse dimension of said band.

16. A color television receiver comprising a picture tube having a raster with a generally vertical edge and means including an endless filter band overlying the screen of said picture tube and having an endless sequence of parallel filter strips slanted relative to said raster edge and providing a monochrome transparency line moving vertically before said screen at the same rate as the vertical scansion of said picture tube.

References Cited in the file of this patent

UNITED STATES PATENTS

| | | |
|---|---|---|
| 2,452,293 | De Forest | Oct. 26, 1948 |
| 2,479,517 | Schensted | Aug. 16, 1949 |
| 2,617,875 | De Forest | Nov. 11, 1952 |
| 2,661,391 | Bedford | Dec. 1, 1953 |
| 2,687,450 | Morrison | Aug. 24, 1954 |
| 2,689,879 | Rehorn | Sept. 21, 1954 |